UNITED STATES PATENT OFFICE.

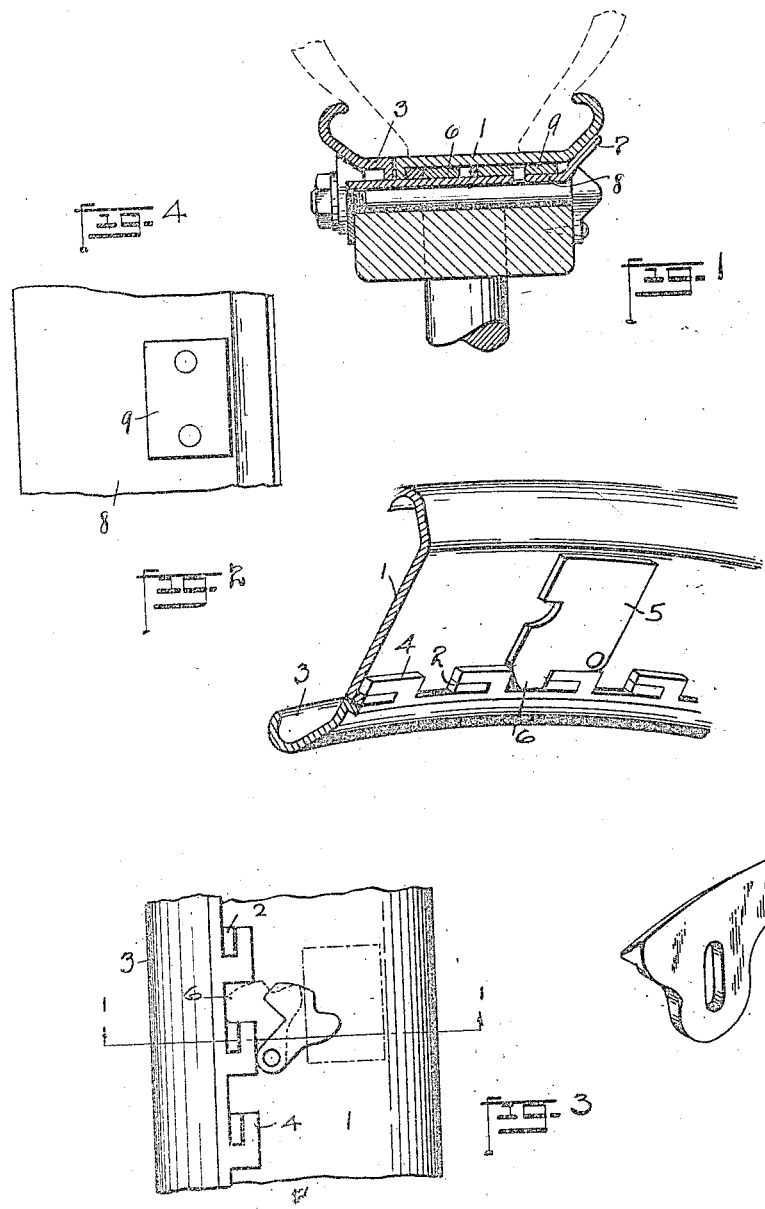

TRACY W. GUTHRIE, OF CLEVELAND, OHIO.

VEHICLE-WHEEL.

1,146,763.　　　　Specification of Letters Patent.　　　Patented July 13, 1915.

Application filed April 3, 1912. Serial No. 689,205.

*To all whom it may concern:*

Be it known that I, TRACY W. GUTHRIE, a citizen of the United States, and a resident of Cleveland, county of Cuyahoga, and State of Ohio, have invented a new and useful Improvement in Vehicle-Wheels, of which the following is a specification, the principle of the invention being herein explained and the best mode in which I have contemplated applying that principle, so as to distinguish it from other inventions.

My present invention relates more particularly to a demountable tire carrying rim made up of two annular laterally abutting portions provided with coöperating locking devices of the kind illustrated for example in U. S. Patent No. 979,468, to J. M. Gilbert, this type of rim being more or less commonly known in the trade as the "Gilbert" rim. The means for interlocking the two separable portions of the tire-supporting rim, as shown in the patent just referred to, comprise a series of lugs provided on the radially inner surface of the portions, and a corresponding series of laterally extending hooked or socket lugs provided on the other portion, the last-named lugs being adapted to engage the first-named series upon opposite circumferential movement of the two portions. Owing to the character of this construction, it is highly desirable that the first series of lugs be driven home in the recesses forming the hooks in the second series of lugs; otherwise a very much increased strain is imposed on the latter by the tendency of the inflated tire, which is held between the flanges on the two sections of the rim, to force the latter apart. It is, of course, also desirable to lock the two sections securely in their engaging position, since otherwise the detachable flange bearing section might rotate sufficiently relatively to the other to become entirely disengaged.

The object of the present invention is to provide a simple device for not merely thus securing the rim sections together with their respective series of lugs in interlocking engagement, but to assist in forcing said lugs into such engagement. Means are also provided which prevent disengagement of the device, which locks the two sections together.

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—Figure 1 is a transverse section through a wheel rim provided with a demountable rim of the present type and is taken on the line 1—1 in Fig. 3; Fig. 2 is a view in perspective of the inner side of the demountable rim showing one form of my locking device; Fig. 3 is a plan view of the inner side of the demountable rim showing my preferred construction of locking means; Fig. 4 is a plan view of a portion of the felly band showing the retaining lug thereon; and Fig. 5 is a perspective view of a slotted keeper used to retain the demountable rim on the felly band.

Only the demountable rim is shown in detail, it being deemed unnecessary to illustrate the felly with its felly band except so far as it is shown in Figs. 1 and 4, and means for securing such demountable tire-supporting rim thereon. It is also unnecessary to more than briefly describe the known features of the demountable rim itself. Thus, said rim consists of two annular laterally abutting portions that abut in a plane perpendicular to the axis of the wheel; one such section 1, preferably the wider one, is provided with a series of down-turned lugs 2 preferably formed integrally with the material of the section itself; while the other section 3 is provided with locking projections or socket lugs 4, likewise preferably formed integrally with said section, and in the preferred form shown extending first downward, and then laterally, so as to project beneath the first-named section, and to be adapted to engage the lugs extending inwardly from the same, upon opposite rotation occurring between the sections.

In order to assemble the sections of the demountable or auxiliary rim, the lugs of the section 1 are slipped between the lugs of the other section, and then said sections are rotated relatively to each other in opposite directions, so that the first-named lugs will pass behind those last named. Such first-named lugs are slightly beveled on their inner engaging edges, so as to more or less readily thus engage with the lugs on section 3; it is frequently a difficult matter to rotate the two sections, owing to the friction between the contacting surfaces of said sections so as to force the lugs home in the slots or recesses of the other lugs. Accordingly, I provide a pivotal latch member 5 on the inner face of the wider section at any convenient point about the periphery of the same and disposed so as to be capable of lying in one position entirely clear of the two series of lugs. Such latch may be of the form shown in Fig. 2, the laterally projecting portion 6 being of wedge shape and so disposed with reference to the lugs on the same section as to fit between two such lugs and leave sufficient space for one of the hooked lugs to lie between it and the next inwardly directed lug. Upon swinging the latch however, into operative position, its wedge end will forcibly contact with the heel of such adjacent hooked lug, and owing to its wedged or beveled conformation will drive such lug, and with it of course, the ring or section of which it is a part, until it is in proper position in snug engagement with the adjacent inwardly turned lug. In this position the latch will then effectually retain the two sections until it is swung back. The fit is made sufficiently tight to insure the latch remaining in place, even when the assembled rim is on the wheel, but double assurance is had by extending the latch to the proper width to fill the lateral space between the lugs and the beveled wall 7 of the felly-band 8, which thus absolutely prevents its swinging outwardly again until the rim is dismounted.

Another construction which may be used for the purpose of holding the latch member in engagement is shown in Figs. 1, 3 and 4. In this form a lug 9 may be attached to the felly band and will then be adapted to substantially contact the latch member when in engagement with the lugs and to prevent disengagement until the rim is dismounted. The latch will then preferably be of the form shown in Fig. 3.

It is unnecessary to describe at length the means for retaining the demountable rim on the wheel as any suitable type may be used. In Fig. 1, I illustrate a bolt 10 engaging the felly 11 of the wheel and having attached thereto a slotted keeper 12 by means of a nut 13. The keeper's beveled engaging face 14 forces the portion 3 onto the felly band as will be readily understood.

The advantages of my construction are several. Disengagement of the interengaging lugs is entirely prevented and yet the means used to secure this are simple, positive in action and not liable to rust into position, which has heretofore been one difficulty experienced.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

The combination with a wheel bearing a felly band, of a demountable tire carrying rim, comprising two annular laterally abutting portions, each of said portions having a plurality of interengaging lugs on the radially inner surface of the same, a latch member pivotally mounted on one of said portions and adapted to retain said lugs in such engagement, said latch having a curved surface on one side adapting it to move such portions into proper circumferential position, and a lug mounted on the radially outer surface of said felly band in position to laterally abut against said latch member upon the mounting of said demountable rim upon said felly band, thereby preventing disengagement of said latch member, said latch member being provided with a notch upon one side to facilitate disengagement.

Signed by me this 4th day of April, 1912.
TRACY W. GUTHRIE.

Attested by—
R. C. COOLEY,
F. L. BRAUN.